US012739710B2

(12) United States Patent
Watfa

(10) Patent No.: US 12,739,710 B2
(45) Date of Patent: Sep. 15, 2026

(54) METHODS FOR PDU SESSION INTERWORKING ACROSS EPS AND 5GS FOR NB-IOT

(71) Applicant: Samsung Electronics Co., Ltd., Gyeonggi-do (KR)

(72) Inventor: Mahmoud Watfa, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 580 days.

(21) Appl. No.: 17/926,877

(22) PCT Filed: May 21, 2021

(86) PCT No.: PCT/KR2021/006350

§ 371 (c)(1),
(2) Date: Nov. 21, 2022

(87) PCT Pub. No.: WO2021/235889

PCT Pub. Date: Dec. 5, 2021

(65) Prior Publication Data

US 2023/0224767 A1 Jul. 13, 2023

(30) Foreign Application Priority Data

May 22, 2020 (GB) ..................................... 2007684
May 28, 2020 (GB) ..................................... 2008044
May 19, 2021 (GB) ..................................... 2107175

(51) Int. Cl.

| | |
|---|---|
| ***H04W 76/11*** | (2018.01) |
| ***H04W 36/00*** | (2009.01) |
| ***H04W 36/14*** | (2009.01) |
| ***H04W 76/34*** | (2018.01) |
| ***H04W 92/02*** | (2009.01) |

(52) U.S. Cl.
CPC ... *H04W 36/0022* (2013.01); *H04W 36/0044* (2013.01); *H04W 36/14* (2013.01)

(58) Field of Classification Search
CPC ......... H04W 36/0022; H04W 36/0044; H04W 36/14; H04W 76/11; H04W 76/34; H04W 76/22; H04W 28/0263; H04W 28/0268; H04W 28/0252; H04W 92/02
USPC .......................................................... 370/331
See application file for complete search history.

(56) References Cited

U.S. PATENT DOCUMENTS 10,708,973 B2 * 7/2020 Martinez Tarradell ...................... H04W 76/10
11,190,861 B2 * 11/2021 Bali ........................ H04L 43/10
11,259,208 B2 * 2/2022 Kim ...................... H04W 76/27
(Continued)

FOREIGN PATENT DOCUMENTS

WO WO 2019/033532 2/2019
WO WO 2020/207424 10/2020

OTHER PUBLICATIONS

European Search Report dated Sep. 18, 2023 issued in counterpart application No. 21809870.5-1216, 13 pages.
(Continued)

*Primary Examiner* — Christopher M Crutchfield
*Assistant Examiner* — Syed Ahmed
(74) *Attorney, Agent, or Firm* — The Farrell Law Firm, P.C.

(57) ABSTRACT

Disclosed is a method of managing PDU session interworking in a User Equipment, UE, wherein if the UE changes from WB-N1 mode to NB-S1 mode, then the UE sets the state of any dedicated EPS bearer context to be inactive.

9 Claims, 2 Drawing Sheets

(56) References Cited

U.S. PATENT DOCUMENTS

| | | | | |
|---|---|---|---|---|
| 11,259,345 | B2 * | 2/2022 | Kawasaki | H04W 8/06 |
| 11,903,066 | B2 * | 2/2024 | Chin | H04W 72/53 |
| 2019/0149421 | A1 | 5/2019 | Jin et al. | |
| 2019/0159157 | A1 | 5/2019 | Gupta | |
| 2020/0329397 | A1 * | 10/2020 | Huang-Fu | H04W 28/0257 |
| 2023/0199605 | A1 * | 6/2023 | Watfa | H04W 36/32 370/331 |

OTHER PUBLICATIONS

PCT/ISA/210 Search Report issued on PCT/KR2021/006350, Aug. 26, 2021, pp. 4.

PCT/ISA/237 Written Opinion issued on PCT/KR2021/006350, Aug. 26, 2021, pp. 5.

Combined Search and Examination Report dated Nov. 4, 2021 issued in counterpart Application No. GB2107175.8, pp. 7.

3GPP TS 24.501 V16.4.1, 3rd Generation Partnership Project; Technical Specification Group Core Network and Terminals; Non-Access-Stratum (NAS) protocol for 5G System (5GS); Stage 3; (Release 16), Apr. 1, 2020, pp. 668.

3GPP TS 23.502 V16.4.0, 3rd Generation Partnership Project; Technical Specification Group Services and System Aspects; Procedures for the 5G System (5GS); Stage 2 (Release 16), Mar. 27, 2020, pp. 582.

3GPP TS 24.301 V16.4.0, 3rd Generation Partnership Project; Technical Specification Group Core Network and Terminals; Non-Access-Stratum (NAS) protocol for Evolved Packet System (EPS); Stage 3 (Release 16), Mar. 27, 2020, pp. 573.

3GPP TS 23.501 V16.4.0, 3rd Generation Partnership Project; Technical Specification Group Services and System Aspects; System architecture for the 5G System (5GS); Stage 2 (Release 16), Mar. 27, 2020, pp. 430.

Samsung, Ericsson, "QoS error checks for UEs in NB-N1 mode", 3GPP TSG-CT WG1 Meeting #123-e, Electronic meeting, C1-202614, Apr. 21, 2020, pp. 17.

Samsung, "Discussion on errors on QoS parameter operations in Nb-IoT", 3GPP TSG CT WG1 Meeting #123-e, Electronic meeting, C1-202387, Apr. 9, 2020, pp. 5.

Sharp, "Handling of PDU session and PDN connection associated with Control plane only indication in case of N26 based interworking procedures", 3GPP TSG-CT WG1 Meeting #123-e, Electronic meeting, C1-202699, Apr. 23, 2020, pp. 14.

EP Communication Report dated Sep. 25, 2025 issued in counterpart application No. 21809870.5-1206, 6 pages.

* cited by examiner

[Fig. 1]
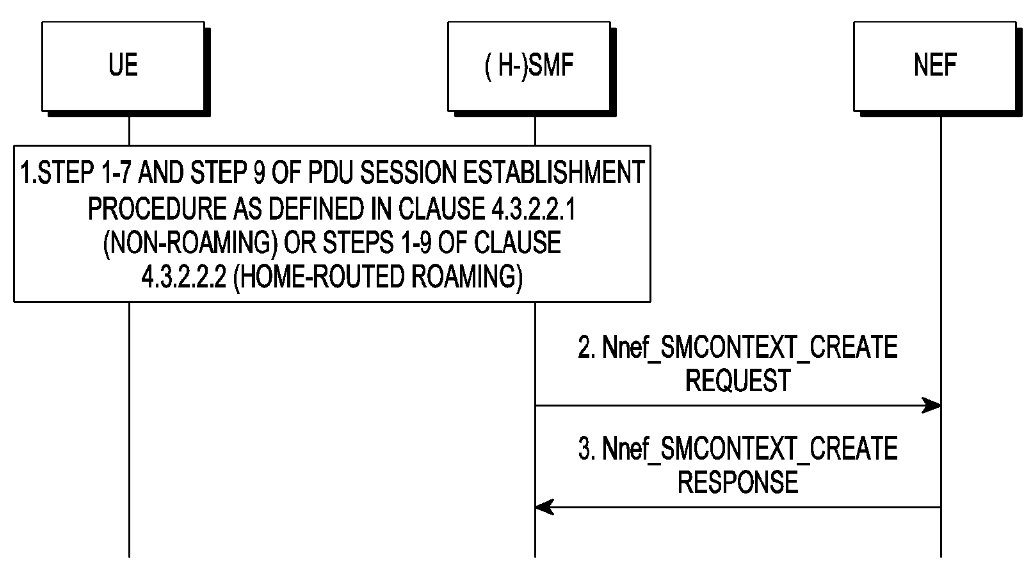
[Fig. 2]
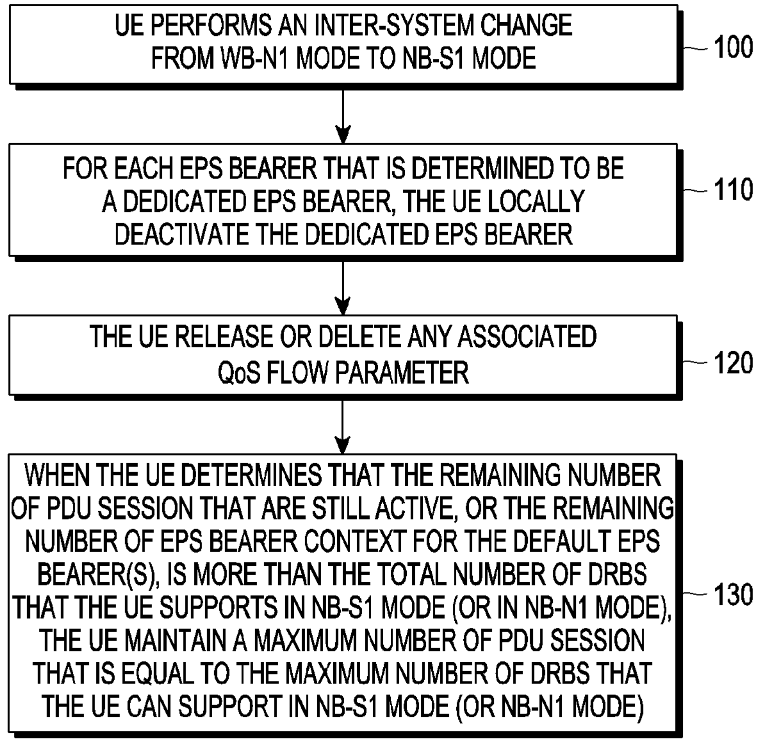

[Fig. 3]
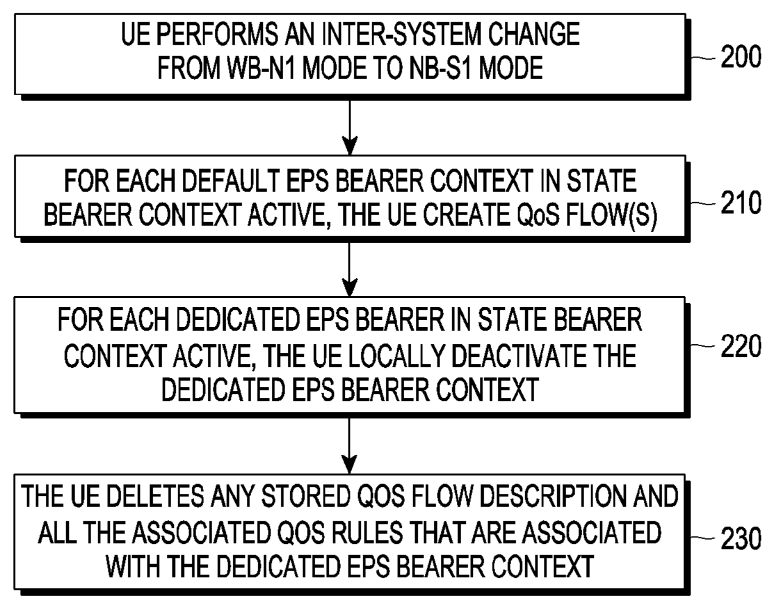

METHODS FOR PDU SESSION INTERWORKING ACROSS EPS AND 5GS FOR NB-IOT

CROSS-REFERENCE TO RELATED APPLICATION(S)

This application is a U.S. National Phase Entry of PCT International Application No. PCT/KR2021/006350, which was filed on May 21, 2021, and claims priority to United Kingdom Patent Application Nos. 2007684.0, 2008044.6, and 2107175.8, which were filed in the United Kingdom Intellectual Property Office on May 22, 2020, May 28, 2020, and May 19, 2021, respectively, the entire disclosure of each of which is incorporated herein by reference.

TECHNICAL FIELD

The present invention relates to interworking across Evolved Packet System (EPS) and Fifth Generation (5GS) networks for NarrowBand-Internet of Things (NB-IoT).

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

The prior art does not consider details of inter-system changes and inter-working for PDU sessions/PDN connections when the UE moves to a target NB-IoT RAT in S1 mode or N1 mode. As such, in the prior art, the UE can end up having dedicated EPS bearers which are not supported in NB-IoT and this can lead to inconsistent UE behaviour and other protocol errors. Similarly, in the prior art, the method provided for handling QoS rules after an inter-system change from WB-S1 to NB-N1 will lead to the UE having QoS rules that are not the default QoS rules, which is not allowed.

Solution to Problem

According to a first aspect of the present invention, there is provided a method of managing PDU session interworking in a User Equipment, UE, wherein if the UE changes from WB-N1 mode to NB-S1 mode, then the UE sets the state of any dedicated EPS bearer context to be inactive.

In an embodiment, to set the dedicated EPS bearer context to be inactive, the UE locally deactivates the bearer.

In an embodiment, the UE further deletes any associated QoS rule and QoS flow descriptions associated with the dedicated EPS bearer.

In an embodiment, the UE determines that an EPS bearer is a dedicated EPS bearer if the EPS bearer identity is associated with a QoS flow description that is in turn associated with a QoS rule that is not the default QoS rule.

In an embodiment, the UE determines a number of PDU sessions that are active and if this number is more than the total number of Data Radio Bearers, DRBs, that the UE supports in NB-S1 mode, then the UE maintains a maximum number of PDU sessions that is equal to the maximum number of PDU session that is equal to the maximum number of DRBs that the UE can support in NB-S1 mode.

In an embodiment, if sending a Tracking Area Update, TAU, Request message, the UE includes the EPS bearer context status Information Element, IE, if the UE has deactivated any dedicated EPS bearer.

According to a second aspect of the present invention, there is provided a method of managing PDU session interworking in a User Equipment, UE, wherein if the UE changes from WB-S1 mode to NB-N1 mode, then the UE maintains a default EPS bearer context and creates an associated QoS flow description and associated default QoS rule.

In an embodiment, if there is a dedicated EPS bearer context, this is set to inactive.

In an embodiment, the UE further deletes any associated QoS rule and QoS flow descriptions associated with the dedicated EPS bearer According to a third aspect of the present invention, there is provided apparatus arranged to perform the method of any preceding aspect.

Embodiments of the invention provide that the UE should handle the QoS rules and parameters for interworking from WB-N1 mode to NB-S1 mode differently from the prior art to avoid the issues set out above. This is at least partly because NB-S1 mode does not support dedicated bearers.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 is a block flow diagram of an embodiment as disclosed herein;

FIG. 2 is a block flow diagram of a method according to an embodiment as disclosed herein; and FIG. 3 is a block flow diagram of a method according to an embodiment as disclosed herein.

MODE FOR THE INVENTION

There are primarily two main types of Commercial IoT (CIoT) optimizations referred to as: user plane (UP) CIoT optimization and control plane (CP) CIoT optimization.

UP CIoT optimization refers to optimizations that relate to the use of the user plane resources. Whereas CP CIoT optimization refers to optimizations that relate to the efficient transfer of data over the control plane. Note that "data" may also refer to SMS and location service messages.

The Network Access Stratum (NAS) specification TS 24.501 (for N1 mode) provides a description of these optimizations and specifically includes sections that specify the UE and network behaviour when CP CIoT optimization is used.

One of the main aspects of CP CIoT optimization is that the User Equipment (UE) can send data from idle mode using the Control Plane Service Request (CPSR) message that has been defined in the NAS specification.

Usually, the UE uses one of these optimizations at a time although it is possible that both get used simultaneously as will be explained shortly. When the UE uses CP CIoT optimization, the UE's Protocol Data Unit (PDU) sessions will be used to transfer data over the control plane i.e. over NAS signalling messages. However, a PDU session that is used for CP CIoT optimization can be a control plane only session, if the PDU Session Establishment Accept message includes the Control plane only indication IE, or the session can be used for CP CIoT optimization and can be switched to a user plane session. Note that the latter is not a permanent switch to a user plane session but rather the UE can request the establishment of the user plane resources and use these resources for the transfer of data over the user plane. The UE may request the switch of the session to user plane based on e.g. the volume of data that needs to be sent or based on other conditions that are not specified. However, what is important to note is that a PDU session for CP CIoT optimization may be a session for control plane data only, or may allow the UE to request the establishment of user plane resources for the transfer of data over the user plane while still considering that the session is for CP CIoT optimization.

When a PDU session gets switched to user plane (i.e. when the user plane resources gets established for such a PDU session), if the UE also supports UP CIoT optimization, then the UE can apply UP CIoT optimization to this session for which user plane has been established. Note that after the release of the user plane resources, the UE continues to use the session as one for CP CIoT optimization unless the UE requests the establishment of user plane resources again. Note that although the user plane resources may be established for a PDU session for CP CIoT optimization, the UE maintains the use of the CPSR message when it needs to initiate the service request procedure for the corresponding PDU session.

For control plane CIoT 5GS optimization, a PDU session that is established to be using control plane only i.e. such session will never be switched to user-plane, will be anchored in the Network Exposure Function (NEF). Such a PDU session has a PDU Session type of "Unstructured". The overall procedure to establish a PDU session that is anchored in the NEF is shown below from section 4.25.2 of TS 23.502. FIG. 1 shows a figure from this document and is referred to in the following:

"When the UE performs the PDU Session establishment with PDU Session type of "Unstructured", and the subscription information corresponding to the UE requested DNN includes the "NEF Identity for NIDD" (NEF ID), then the SMF initiates a SMF-NEF Connection establishment procedure towards the NEF corresponding to the "NEF ID" for that DNN/S-NSSAI Combination.

1. Steps 1-7 and step 9 of clause 4.3.2.2.1 for UE-requested PDU Session Establishment Procedure for non-roaming scenarios or steps 1-9 of clause 4.3.2.2.2 for UE-requested PDU Session Establishment Procedure for home-routed roaming scenarios. The (H-)SMF receives the Session Management Subscription data for the corresponding SUPI, DNN and S-NSSAI that is associated with NEF Identity for NIDD and NIDD information such GPSI and AF ID.

2. If the subscription information corresponding to DNN and S-NSSAI includes the "NEF Identity for NIDD" (NEF ID), the SMF shall create a PDU session towards the NEF. The SMF invokes Nnef_SMContext_Create Request (User Identity, PDU session ID, SMF ID, NIDD information, S-NSSAI, DNN) message towards the NEF. The UE capability to support Reliable Data Service (RDS) is included in the PCO in the PDU Session Establishment Request message.

If no AF has previously performed the NIDD Configuration procedure with the NEF for the User Identity received in step 2, then the NEF initiates the NIDD Configuration procedure (see clause 4.25.3) before step 3.

3. The NEF creates an NEF PDU session Context and associates it with User Identity and PDU session ID. The NEF invokes Nnef_SMContext_Create Response (User Identity, PDU session ID, S-NSSAI, DNN) towards the SMF confirming establishment of the PDU session to the NEF for the UE. If NEF supports and allows use of RDS, it indicate that to SMF and the SMF includes it in the PCO. If NEF supports Extended Buffering, NEF includes Extended Buffering Support indication in the response and subscribes for mobility-related events with the AMF to receive an indication when the UE becomes reachable."

Other PDU sessions, although used for control plane CIoT 5GS optimization, the AMF may decide to have such a session anchored at the UPF (also referred to as N6 PDU session) as described in the NAS specification:

"If the UE and the network support both the control plane CIoT 5GS optimization and N3 data transfer, then when receiving the UE's request for a PDU session establishment, the AMF decides whether the PDU session should be NEF PDU session or N6 PDU session as specified in 3GPP TS 23.501 and then:

a) if NEF PDU session is to be established for unstructured data type, the AMF includes Control plane only indication for the requested PDU session to the SMF;

b) if N6 PDU session is to be established and the DNN or S-NSSAI of the newly requested N6 PDU session supports interworking with EPS as specified in TS 23.502:

1) if there are existing N6 PDU sessions supporting interworking with EPS for this UE that were established with the Control plane only indication, the AMF includes the Control plane only indication for the newly requested N6 PDU session to the SMF; or 2) if there are existing N6 PDU sessions supporting interworking with EPS for this UE that were established without the Control plane only indication, the AMF does not include the Control plane only indication for the newly requested N6 PDU session to the SMF;

3) if there is no existing N6 PDU session supporting interworking with EPS for this UE, the AMF determines whether to include the Control plane only indication for the newly requested N6 PDU session to the SMF based on local policies, the UE's preferred CIoT network behaviour and the supported CIoT network behaviour; and c) if N6 PDU session is to be established and the DNN or S-NSSAI of the N6 PDU session does not support interworking with EPS as specified in TS 23.502, the AMF determines whether to include the Control plane only indication for the newly requested N6 PDU session to the SMF based on local policies, the UE's preferred CIoT network behaviour and the supported CIoT network behaviour."

CIoT 5GS optimizations (i.e. control plane CIoT 5GS optimization and user plane CIoT 5GS optimization) are not supported over non-3GPP access.

There are issues regarding restrictions on UP resources for NB-IoT. NB-IoT devices are restricted by the number of data radio bearers (DRBs) that they can support where the maximum is 2 DRBs at a time. In 5GS, unlike EPS, the UE can have selective user-plane activation of any of its PDU sessions that it has established. For example, if the UE has established 3 PDU sessions, it does not necessarily mean that the UE will have DRBs for all 3 PDU sessions. Based on the need to send data over a particular PDU session, the UE can request the establishment of UP resources for 1 of its PDU sessions only. Note that UP resources constitute DRBs and other resources e.g. between the RAN and the CN nodes such as the UPF (User Plane Function). Hence, UP resources are not necessarily limited to DRBs but can be used to refer to DRBs.

To select the establishment of UP resources for a specific PDU session, the UE uses the Uplink data status IE to indicate which PDU session ID are the resources being requested for. The IE can be sent in the Control Plane Service Request (CPSR) message, Service Request (SR) message, or Registration Request message. The inclusion of the Uplink data status IE in the Registration Request message is based on specific conditions that are defined in the NAS specification. However, in general, the CPSR or SR message is used for the purpose of requesting the establishment of UP resources for at least one PDU session.

In NB-IoT, there can be UP resources established for at most 2 PDU sessions at a given time since the UE is limited by the number of DRBs that it can support in this mode.

Due to the restrictions described above, the NAS specification has defined certain restrictions on the UE that is using user-plane CIoT 5GS optimization. For example, the following restriction is introduced for the service request procedure:

"In NB-N1 mode, this procedure shall not be used to request the establishment of user-plane resources:

a) for more than two PDU sessions if there is currently:

1) no user-plane resources established for the UE;

2) user-plane resources established for one PDU session; or b) for additional PDU sessions, if the UE already has user-plane resources established for two PDU sessions."

The following restriction (see bullet c) is introduced for the PDU session establishment procedure:

"The UE shall not request a PDU session establishment:

a) for an LADN when the UE is located outside the LADN service area;

b) to transfer a PDU session from non-3GPP access to 3GPP access when the 3GPP PS data off UE status is "activated" and the UE is not using the PDU session to send uplink IP packets for any of the 3GPP PS data off exempt services (see subclause 6.2.10); or c) when the UE is in NB-N1 mode, the UE has indicated preference for user plane CIoT 5GS optimization, the network has accepted the use of user plane CIoT 5GS optimization for the UE, and the UE currently has user-plane resources established for two other PDU sessions."

Although these restrictions are put in place for the UE, the network will still perform a check to ensure that the restrictions are not ignored or erroneously disregarded. For example, during the PDU session establishment procedure, the AMF verifies if the UE already has UP resources established for at most 2 PDU sessions. If this is the case, then any new request to establish a PDU session from the UE will either be established as a PDU session for control plane CIoT optimization, or it will be rejected by the AMF. This is described below from the NAS specification:

"Upon reception of a UL NAS TRANSPORT message, if the Payload container type IE is set to "N1 SM information", the Request type IE is set to "initial request", and a) the UE is in NB-N1 mode;

b) the UE has indicated preference for user plane CIoT 5GS optimization;

c) the network accepted the use of user plane CIoT 5GS optimization; and d) the AMF determines that there are user-plane resources established for two other PDU sessions for this UE (see 3GPP TS 23.501);

the AMF shall either:

a) send back to the UE the message which was not forwarded as specified in in subclause 5.4.5.3.1 case h1); or b) proceed with the PDU session establishment and include the Control Plane CIoT 5GS Optimisation indication or Control Plane Only indicator to the SMF."

It should be noted again that these restrictions are only for NB-IoT devices i.e. UEs in NB-N1 mode in the case of 5GC.

Similar limitations exist for a UE in NB-IoT that is using CIoT optimizations in EPS i.e. a UE in NB-S1 mode. The main difference however, between EPC and 5GC, is that EPC does not support selective user plane activation for a UE in connected mode (EMM-CONNECTED mode). As such, while in S1 mode, if the UE is in connected mode for the purpose of data then the DRBs and UP resources will be set up for all PDN connections that are active in the UE. So, for example, if the UE has established 3 PDN connections in EPS, when the UE sends the Service Request message, the MME will establish the UP resources for all 3 PDN connections.

However, for NB-IoT devices there is a limitation regarding the maximum number of DRBs that can be supported in S1 mode. The UE can support 1 or 2 DRBs, where 2 is the maximum number of DRBs that can be supported as described in 3GPP TS 24.301 V16.4.0:

"For a UE in NB-S1 mode, the UE's implementation-specific maximum number of active user plane radio bearers is 2 (as defined in 3GPP TS 36.300) when the UE sets the Multiple DRB support bit to "Multiple DRB supported" during attach or tracking area update procedures, and 1 otherwise."

The UE in S1 mode indicates in the UE network capability IE whether it supports 2 DRBs by setting the "Multiple DRB support" bit to "Multiple DRB supported"

It should also be noted that for NB-S1 mode, the support of DRB is limited to default EPS bearers and dedicated EPS bearers are not supported on NB-S1 mode. This is similar to 5GS in this regard. The following is specified in 3GPP TS 24.301 V16.4.0 regarding this:

"In NB-S1 mode, the dedicated EPS bearer contexts activation procedure is not used. Upon an inter-system mobility from WB-S1 mode to NB-S1 mode in EMM-IDLE mode, if the UE has at least one dedicated EPS bearer context in ESM state BEARER CONTEXT ACTIVE, the UE shall locally deactivate any such dedicated EPS bearer context and shall include the EPS bearer context status IE in TRACKING AREA UPDATE REQUEST message."

When the UE moves to NB-S1 mode, from WB-S1 mode, the UE will deactivate any dedicated EPS bearer and include the EPS bearer context status IE in TRACKING AREA UPDATE REQUEST message as specified in 3GPP TS 24.301 V16.4.0:

"The UE shall include the EPS bearer context status IE in TRACKING AREA UPDATE REQUEST message:

for the case g;

for the case s;

for the case zb;

if the UE has established PDN connection(s) of "non IP" or Ethernet PDN type; and if the UE locally deactivated at least one dedicated EPS bearer context upon an inter-system mobility from WB-S1 mode to NB-S1 mode in EMM-IDLE mode."

It should be noted that the EPS bearer context status IE indicates which EPS bearer identity is active in the UE and the IE contains a bitmap each bit of which corresponds to a well known EPS bearer identity (see section 9.9.2.1 of 3GPP TS 24.301 V16.4.0).

With respect to the handling of PDU session parameters during Inter-working with EPS, the following is specified in the NAS specification regarding interworking and the transfer of PDU sessions between N1 mode and S1 mode. During interworking, the UE has to handle specific parameters as defined by the following rules from the NAS specification:

"Interworking with EPS is supported for a PDU session, if the PDU session includes the mapped EPS bearer context(s) or has association(s) between QoS flow and mapped EPS bearer after inter-system change from S1 mode to N1 mode. The SMF shall not include any mapped EPS bearer contexts associated with a PDU session for LADN and with a PDU session which is a multi-homed IPv6 PDU session. See coding of the Mapped EPS bearer contexts IE in subclause 9.11.4.8. In an MA PDU session, the UE shall have one set of the mapped EPS bearer contexts. The network can provide the set of the mapped EPS bearer contexts of the MA PDU session via either access of the MA PDU session. In an MA PDU session, the UE shall support modification or deletion via an access of a mapped EPS bearer context of the MA PDU session created via the same or the other access.

Upon inter-system change from N1 mode to S1 mode, the UE shall create the default EPS bearer context and the dedicated EPS bearer context(s) based on the parameters of the mapped EPS bearer contexts or the associations between QoS flow and mapped EPS bearer in the PDU session, if available. The EPS bearer identity assigned for the QoS flow of the default QoS rule becomes the EPS bearer identity of the default bearer in the corresponding PDN connection. If there is no EPS bearer identity assigned to the QoS flow of the default QoS rule of a PDU session associated with 3GPP access, the UE shall perform a local release of the PDU session. If there is no EPS bearer identity assigned to the QoS flow(s) of a PDU session associated with 3GPP access which is not associated with the default QoS rule, the UE shall locally delete the QoS rules and the QoS flow description(s). The UE uses the parameters from each PDU session for which interworking with EPS is supported to create corresponding default EPS bearer context and optionally dedicated EPS bearer context(s) as follows:

a) the PDU session type of the PDU session shall be mapped to the PDN type of the default EPS bearer context as follows:

1) the PDN type shall be set to "non-IP" if the PDU session type is "Unstructured";

2) the PDN type shall be set to "IPv4" if the PDU session type is "IPv4";

3) the PDN type shall be set to "IPv6" if the PDU session type is "IPv6";

4) the PDN type shall be set to "IPv4v6" if the PDU session type is "IPv4v6";

5) the PDN type shall be set to "non-IP" if the PDU session type is "Ethernet", and the UE, the network or both of them do not support Ethernet PDN type in S1 mode; and 6) the PDN type shall be set to "Ethernet" if the PDU session type is "Ethernet" and the UE and the network support Ethernet PDN type in S1 mode;

b) the PDU address of the PDU session shall be mapped to the PDN address of the default EPS bearer context as follows:

1) the PDN address of the default EPS bearer context is set to the PDU address of the PDU session, if the PDU session type is "IPv4", "IPv6" or "IPv4v6"; and 2) the PDN address of the default EPS bearer context is set to zero, if the PDU session type is "Ethernet" or "Unstructured";

c) the DNN of the PDU session shall be mapped to the APN of the default EPS bearer context;

d) the APN-AMBR and extended APN-AMBR received in the parameters of the default EPS bearer context of the mapped EPS bearer contexts shall be mapped to the APN-AMBR and extended APN-AMBR of the default EPS bearer context;

e) for each PDU session in state PDU SESSION ACTIVE, PDU SESSION MODIFICATION PENDING or PDU SESSION INACTIVE PENDING the UE shall set the state of the mapped EPS bearer context(s) to BEARER CONTEXT ACTIVE; and f) for any other PDU session the UE shall set the state of the mapped EPS bearer context(s) to BEARER CONTEXT INACTIVE.

Additionally, for each mapped EPS bearer context or the association between QoS flow and mapped EPS bearer in the PDU session:

a) the EPS bearer identity shall be set to the EPS bearer identity received in the mapped EPS bearer context, or the EPS bearer identity associated with the QoS flow;

b) the EPS QoS parameters shall be set to the mapped EPS QoS parameters of the EPS bearer received in the mapped EPS bearer context, or the EPS QoS parameters associated with the QoS flow;

c) the extended EPS QoS parameters shall be set to the mapped extended EPS QoS parameters of the EPS bearer received in the mapped EPS bearer context, or the extended EPS QoS parameters associated with the QoS flow; and d) the traffic flow template shall be set to the mapped traffic flow template of the EPS bearer received in the mapped EPS bearer context, or the stored traffic flow template associated with the QoS flow, if available.

After inter-system change from N1 mode to S1 mode, the UE shall associate the PDU session identity, the S-NSSAI, and the session-AMBR with the default EPS bearer context, and for each EPS bearer context mapped from one or more QoS flows, associate the QoS rule(s) for the QoS flow(s) and the QoS flow description(s) for the QoS flow(s) with the EPS bearer context.

After inter-system change from N1 mode to S1 mode, the UE and the SMF shall maintain the PDU session type of the PDU session until the PDN connection corresponding to the PDU session is released if the UE supports non-IP PDN type and the PDU session type is "Ethernet" or "Unstructured".

After inter-system change from N1 mode to S1 mode, the UE and the SMF shall maintain the following 5GSM attributions and capabilities associated with the PDU session until the PDN connection corresponding to the PDU session is released:

the always-on PDU session indication;

the maximum number of supported packet filters;

the support of reflective QoS;

the maximum data rate per UE for user-plane integrity protection supported by the UE for uplink and the maximum data rate per UE for user-plane integrity protection supported by the UE for downlink; and the support of multi-homed IPv6 PDU session.

After inter-system change from N1 mode to S1 mode, the UE shall deem that the following features are supported by the network on the PDN connection corresponding to the PDU session:

PS data off; and

Local address in TFT.

If there is a QoS flow used for IMS signalling, after inter-system change from N1 mode to S1 mode, the EPS bearer associated with the QoS flow for IMS signalling becomes the EPS bearer for IMS signalling."

The text above describes that the UE, at inter-system change from N1 mode to S1 mode, will create mapped EPS bearer context for the default bearer and the dedicated bearer, specifically "the UE shall create the default EPS bearer context and the dedicated EPS bearer context(s) based on the parameters of the mapped EPS bearer contexts or the associations between QoS flow and mapped EPS bearer in the PDU session, if available"

For example, when the UE moves from N1 mode to S1 mode, then for "each PDU session in state PDU SESSION ACTIVE, PDU SESSION MODIFICATION PENDING or PDU SESSION INACTIVE PENDING the UE shall set the state of the mapped EPS bearer context(s) to BEARER CONTEXT ACTIVE", i.e. this means that the UE considers the EPS bearer context to be active and hence can be transferred.

And "after inter-system change from N1 mode to S1 mode, the UE shall associate the PDU session identity, the S-NSSAI, and the session-AMBR with the default EPS bearer context, and for each EPS bearer context mapped from one or more QoS flows, associate the QoS rule(s) for the QoS flow(s) and the QoS flow description(s) for the QoS flow(s) with the EPS bearer context." i.e. the QoS rule(s) and the QoS flow descriptions(s) are maintained and are associated with the EPS bearer context.

The aforementioned gives a thorough view of the prior art and certain issues therewith. The following sets out particular issues in the prior art which embodiments of the present invention seek to address.

The UE may be in WB-N1 mode over which there is no restriction regarding the UP resources that can be established for a certain number of PDU sessions that the UE has. Unlike NB-N1 mode, the UE in WB-N1 mode can have UP resources for more than 3 PDU sessions, whereas NB-N1 mode requires that UP resources can only exist for a maximum of 2 PDU sessions at any given time.

However, a UE in WB-N1 mode that also supports S1 mode may perform idle mode mobility into NB-S1 mode. If the UE has at least 3 PDU sessions in WB-N1 mode, or a certain number of PDU sessions for which there is an associated EPS bearer context such that there is at least one dedicated EPS bearer, then the current specifications will lead to the UE having either (i) at least one dedicated bearer that is maintained in the UE, or (ii) more than 2 default bearers. As per the requirements set out above, the UE cannot have a dedicated bearer in NB-S1 mode. Moreover, the UE cannot have more than 2 default bearers since only 2 DRBs can be established in EPS especially noting there the is no selective UP activation like in 5GS i.e. in EPS, there UE cannot have more e.g. 3 PDN connections and selectively request the establishment of UP resources for 2 of these PDN connections. Hence there is a need to address this issue to resolve, or at least ameliorate, it so that the requirements on the number and type of bearers that need to be maintained for UEs in NB-S1 mode are met.

Similarly, when the UE moves from WB-S1 mode to NB-N1 mode, the UE currently maintains QoS rules that are not the default QoS rule and this is not allowed for NB-N1 mode. Hence, embodiments of the present invention seek to address this issue also.

According to the present invention there is provided an apparatus and method as set forth in the appended claims. Other features of the invention will be apparent from the dependent claims, and the description which follows.

As a part of the handling of the PDU session parameters, if the UE is going to NB-S1 mode, then the UE should set the state of any dedicated EPS bearer context to be inactive (i.e. locally deactivate the bearer) and also delete any associated QoS rules and QoS flow descriptions.

The UE should ensure that only default EPS bearers are active. The UE should further ensure that the total number of active default EPS bearers does not exceed the total number of DRBs that can be supported by the UE. When sending a Tracking Area Update Request message, the UE should include the EPS bearer context status IE if the UE had deactivated any dedicated EPS bearer as set out.

Similarly, when the UE moves from WB-S1 mode to NB-N1 mode, if the UE has a dedicated EPS bearer, then the UE should deactivate the dedicated EPS bearer and delete any associated QoS rule(s) and QoS flow descriptions. The UE should ensure that each PDU session that is transferred will only contain a default QoS rule. This is because non-default QoS rules are not supported in NB-N1 mode.

The prior art does not consider details of inter-system changes and inter-working for PDU sessions/PDN connections when the UE moves to a target NB-IoT RAT in S1 mode or N1 mode. As such, in the prior art, the UE can end up having dedicated EPS bearers which are not supported in NB-IoT and this can lead to inconsistent UE behaviour and other protocol errors. Similarly, in the prior art, the method provided for handling QoS rules after an inter-system change from WB-S1 to NB-N1 will lead to the UE having QoS rules that are not the default QoS rules, which is not allowed.

According to an embodiment of the present invention, a method is provided whereby DRBs which may not be supported in NB-IoT are released. The UE may be in WB-N1 mode with one or more PDU sessions for which interworking with EPS is supported. As indicated earlier, when the UE performs an inter-system change from N1 mode to S1 mode, the UE creates EPS bearer context for the default bearer and for the dedicated bearers if any.

With regard to the following, reference is made to FIG. 2 which shows steps in the following method.

However, when the UE is performing an inter-system (100) change from WB-N1 mode to NB-S1 mode, for each PDU session in state PDU SESSION ACTIVE, PDU SESSION MODIFICATION PENDING or PDU SESSION INACTIVE PENDING, for which there is/are mapped EPS bearer context(s) or the PDU session has association(s) between QoS flow and mapped EPS bearer, then:

For each EPS bearer that is determined to be a dedicated EPS bearer, the UE shall locally deactivate the dedicated EPS bearer. This may be achieved by the UE setting the state of the mapped EPS bearer context(s), which is determined to be the dedicated EPS bearer, to BEARER CONTEXT INACTIVE (110)

The UE shall also release or delete any associated QoS flow parameter i.e. the UE deletes any QoS rule that is associated with the dedicated EPS bearer and the UE deletes any QoS flow description that is associated with the dedicated EPS bearer (120)

Note that the UE may determine that an EPS bearer is a dedicated EPS bearer if the EPS bearer identity is associated with a QoS flow description that is in turn associated with a QoS rule that is not the default QoS rule. The association between the EPS bearer (identity) and the QoS flow description, and hence the QoS rule, may be via the QFI (QoS Flow Identifier) i.e. if the EPS bearer identity is associated with a QoS flow description for which the QFI is not the QFI of the default QoS rule, or if the mapped EPS bearer context is associated with a QFI that is not the QFI of the default QoS rule, then the UE may conclude that the EPS bearer (identified by an EPS bearer identity) is a dedicated EPS bearer.

When the UE determines that the remaining number of PDU session that are still active, or the remaining number of EPS bearer context for the default EPS bearer(s), is more than the total number of DRBs that the UE supports in NB-S1 mode (or in NB-N1 mode), then:

- the UE shall maintain a maximum number of PDU session that is equal to the maximum number of DRBs that the UE can support in NB-S1 mode (or NB-N1 mode) (140). Hence, the UE should release all PDU sessions that are in excess of that maximum number. How the UE determines which PDU session is maintained and which PDU session is released is up to UE implementation. However, for example, if there is a PDU session which the UE was using to send exception data (or to send data for an exceptional event or to send data for exception reporting), the UE should maintain this PDU session and not delete it
- the UE shall maintain a maximum number of default EPS bearers that is equal to the maximum number of DRBs that the UE can support in NB-S1 mode (or NB-N1 mode). Hence, the UE should release all default EPS bearers that are in excess of that maximum number. How the UE determines which default EPS bearer is maintained and which default EPS bearer is released is up to UE implementation. However, for example, if there is a default EPS bearer that is associated with a PDU session that the UE was using to send exception data (or to send data for an exceptional event or to send data for exception reporting), the UE should maintain this default EPS bearer and PDU session and not delete it Optionally, the UE does not release the EPS bearers, or at least the UE does not release the default EPS bearers when the number of such bearers is greater than the number of DRBs that the UE can support, and therefore leaves it up to the core network (e.g. MME) to do so.

However, the UE should still include the EPS bearer context status IE in the Tracking Area Update (TAU) Request message, optionally, if at least one dedicated EPS bearer context is released. In this case the following is proposed for the MME (noting that the following, optionally, only apply for a UE in NB-S1 mode):

When the MME receives the TAU Request message, the MME verifies if the EPS bearer context status IE is included in the message:

If the EPS bearer context status IE is not included, the MME can verify the UE's context that is retrieved from source CN node, where the source CN node may be a source MME (e.g. in the case of inter-system mobility from WB-S1 mode to NB-S1 mode) or a source AMF (e.g. in the case of inter-system change from N1 mode) and determine if the UE's context includes default EPS bearers or dedicated EPS bearers.

If the MME determines that there is at least one dedicated EPS bearer for the UE, the MME should locally release or deactivate the dedicated EPS bearer and indicate in, by setting the appropriate bit position of, the EPS bearer context status IE of the TAU Accept message that the dedicated EPS bearer in question has been released or deactivated. The MME may first determine which EPS bearer is a dedicated EPS bearer before releasing the EPS bearer that has been determined to be a dedicated EPS bearer.

If the MME determines that there is at least one default EPS bearer for the UE, the MME should determine whether the number of active default EPS bearers exceed the number of DRBs that the UE supports (i.e. the UE's implementation-specific maximum number of DRBs) based on the Multiple DRB supported bit that the UE included (in the UE network capability IE) in the TAU Request message. If the MME determines that the number of active default EPS bearers for the UE is larger than the number of DRBs that the UE can support, then the MME should release or deactivate the excess default EPS bearer such that the active default EPS bearers that remain (i.e. are in state BEARER CONTEXT ACTIVE) will not exceed the maximum number of DRBs that the UE can support. If any such default EPS bearer is released by the MME, then the MME shall include the EPS bearer context status IE in the TAU Accept message to indicate to the UE which bearers have been deactivated and which bearers are still active. The MME may decide to release a specific default EPS bearer based on local policies. For example, a session that is known to be used for sending exception data reporting may not be released. Of if the MME determines that a certain session can be used to send high priority data or is used for sending data towards a specific APN, then the MME may keep the default bearer that is associated with this session or PDN connection.

When the MME receives the TAU Request, the MME verifies if the EPS bearer context status IE is included in the TAU Request message. If yes, then:

The MME verifies if the UE indicated that there is at least one active dedicated EPS bearer context or verifies if an EPS bearer that the UE indicated to be active corresponds to a dedicated EPS bearer, then the MME takes the same action as described above i.e. the MME releases or deactivates the dedicated EPS bearer. The MME also indicates to the UE in the EPS bearer context status IE which default EPS bearer has been released or which is still active in the MME by including the IE in the TAU Accept message.

The MME (may first determine which EPS bearer is a default EPS bearer and) verifies the number of default EPS bearers that the UE has active or that the UE has indicated to be active based on the EPS bearer context status IE that was received in the TAU Request message. The MME then takes the same actions as proposed above i.e. if the number of active default EPS bearers is larger than the number of DRBs that he UE can support, then the MME releases or deactivate the default EPS bearers that are in excess of what the UE can actually support (as described above). The choice of which default EPS bearers to release is as described above. The MME also indicates to the UE in the EPS bearer context status IE which default EPS bearer has been released or which is still active in the MME by including the IE in the TAU Accept message.

Note that the details above, and throughout this application, apply for a UE that is in NB-S1 mode or that is using user plane CIoT EPS optimization (i.e. the UE requested the use of user plane CIoT EPS optimization and the network allows the use of user plane CIoT EPS optimization).

It is also possible that the UE is using control plane CIoT EPS optimization and the UE has at least one PDN connection that is not for control plane only i.e. the MME did not include the Control plane only indication IE in the Activate Default EPS Bearer Context Request message. In this case, the UE can send the Control Plane Service Request message (CPSR) and request the establishment of user plane resources. This (existing funcationality) can be done by the UE setting the “Active” flag bit of the Control plane service type IE to ‘1’ (see section 9.9.3.47 of TS 24.301). However, if the UE has a number of PDN connections that is larger than the maximum number of DRBs that the UE can send, then setting this bit to ‘1’ means that the UE is requesting UP resources for all the PDN connections. When the MME receives a CPSR message with the “Active” flag bit set to ‘1’ in the Control plane service type IE, the MME should behave as follows:

The MME should verify the number of PDN connections that are currently active for the UE.

If this number is smaller or the same as the maximum number of DRBs that the UE can support, then the MME can accept the UE’s request and establish the user plane resources for the UE.

If this number is larger than the maximum number of DRBs that the UE can support, then the MME should not establish the user plane resources for the UE. In this case, the MME may use an existing EMM cause that is sent back to the UE in the Service Reject message e.g. #40 (No EPS bearer context activated) or #9 (UE identity cannot be derived by the network). Alternatively, the MME can use a new EMM cause that is defined to indicate that the requested service cannot be granted. To use this new EMM cause towards a supporting UE, the UE should indicate in the Attach Request or TAU Request message whether it can support receiving this cause. This new indication informs the MME whether the UE can understand or process such a new EMM cause. For example, the new EMM cause can indicate that the DRBs cannot be established due to maximum number of DRBs supported by the UE being less that what the UE has requested. This new EMM cause can be set to any new value #X, where X is an integer. When the UE receives this new EMM cause e.g. #X, the UE remains in EMM-REGISTERED state (optionally in EMM-REGISTERED.NORMAL-SERVICE) and may retry the request however the UE should ensure that the subsequent request does not contain a request to establish UP resources for a certain number of DRBs that exceeds the maximum number of DRBs that the UE can support Optionally, the MME should establish user plane resources for the UE corresponding to the maximum number of DRBs that the UE can support. This may mean that the MME should deactivate or release one or more default EPS bearer such that the maximum number of default EPS bearers that remain active for the UE will not exceed the maximum number of DRBs that the UE can support. The MME may use its local policies or other configuration to determine which default EPS bearers to release. If any is released, the MME should include the EPS bearer context status IE in the Service Accept message that is sent back to the UE and should indicate which bearer has been released and which remains active in the MME Note that, for each PDU session in state PDU SESSION ACTIVE, PDU SESSION MODIFICATION PENDING or PDU SESSION INACTIVE PENDING, the UE may first determine the maximum number of current PDU sessions for which there is/are mapped EPS bearer context(s) or the PDU session has association(s) between QoS flow and mapped EPS bearer, where the mapped EPS bearer context or the mapped EPS bearer is a default EPS bearer. If this number is more than the maximum number of DRBs that the UE can support in NB-S1 mode (or NB-N1 mode), the UE shall maintain a total number of PDU sessions that is not more than the maximum number of DRBs that the UE can support in NB-S1 mode (or NB-N1 mode) and release all other PDU sessions.

How the UE determines which PDU session is maintained and which PDU session is released is up to UE implementation. However, for example, if there is a PDU session which the UE was using to send exception data (or to send data for an exceptional event or to send data for exception reporting), the UE should maintain this PDU session and not delete it. Then, for each PDU session that is maintained, the UE should then verify if the maintained PDU session has any mapped EPS bearer context(s) or if the maintained PDU session has association(s) between QoS flow and mapped EPS bearer. If so, the UE should delete each and every dedicated EPS bearer (or the EPS bearer context for each dedicated EPS bearer) as set out above.

Note that the steps above are applied for each PDU session in state PDU SESSION ACTIVE, PDU SESSION MODIFICATION PENDING or PDU SESSION INACTIVE PENDING, or for each EPS bearer that is associated with a PDU session in state PDU SESSION ACTIVE, PDU SESSION MODIFICATION PENDING or PDU SESSION INACTIVE PENDING.

When the UE sends a Tracking Area Update Request message, following an inter-system change from WB-N1 mode (or WB-S1 mode) to NB-S1 mode:

- if the UE has at least one dedicated EPS bearer context in ESM state BEARER CONTEXT ACTIVE, the UE shall locally deactivate any such dedicated EPS bearer context and shall include the EPS bearer context status IE in TRACKING AREA UPDATE REQUEST message. Alternatively, if the UE had deactivated any dedicated EPS bearer context as described above, then the UE shall include the EPS bearer context status IE in TRACKING AREA UPDATE REQUEST message.
- if the UE has default EPS bearers that are active, the UE should ensure that the number of active default EPS bearers is not bigger than the maximum number of DRBs that the UE can support in NB-S1 mode. Hence, the UE should deactivate default EPS bearers such that the total number of default EPS bearers does not exceed the maximum number of DRBs that the UE can support. Which default EPS bearers the UE chooses to release/deactivate and which default EPS bearers the UE chooses to maintain as active is up to UE implementation. However, if there is a default bearer that is used for a PDN connection for sending exception data reporting, then the UE should not deactivate such default EPS bearer.

Alternatively, the UE does not activate any default EPS bearer even if the total number of active default EPS bearer is more than the maximum number of DRBs that the UE can support. In this case, the network (e.g. MME) decides to deactive some default EPS bearers and maintains only a number of default EPS bearers active (i.e. PDN connections active) where this number is equal to the number of maximum DRBs that the UE reports or indicates to support via the Multiple DRB support bit.

The details above mean that when a UE is performing an inter-system change from WB-N1 mode to S1 mode, the UE should perform the following check or determination:

If the UE determines that it is entering NB-S1 mode, then the UE behaves as set out herein If the UE determines that it is entering WB-S1 mode, then the UE behaves as currently specified in TS 24.501 regarding the handling of QoS parameters and QoS flows and EPS bearers. Specifically, the UE can create dedicated EPS bearer context in this case and transfer them to WB-S1 mode and these bearers can have associated QoS rules and QoS flow descriptions.

The steps and techniques in this document may optionally apply when the UE is operating in single registration mode, or when the network supports the N26 interface.

An inter-system change from S1 mode to N1 mode is also possible. Moreover, it is possible that the UE is in WB-S1 mode and then performs an inter-system change to NB-N1 mode. As such, the details set out previously can also apply in such a case.

Reference is made to FIG. 3 which shows steps in the method presented here.

A UE in WB-S1 mode can have at least one dedicated EPS bearer within (or associated with) at least one PDN connection. Upon inter-system change from WB-S1 mode to NB-N1 mode (200), for each PDN connection and:

- for each default EPS bearer context (.e. for each context of a default EPS bearer) in state BEARER CONTEXT ACTIVE, the UE shall create QoS flow(s) (210) each of which is associated with the QoS flow description received in the Protocol configuration options IE or Extended protocol configuration options IE in the ACTIVATE DEFAULT EPS BEARER REQUEST message, ACTIVATE DEDICATED EPS BEARER REQUEST message, and/or MODIFY EPS BEARER REQUEST message (see 3GPP TS 24.301 [15]), or the QoS flow description associated with EPS bearer context
- for each dedicated EPS bearer context (i.e. for each context of a dedicated EPS bearer) in state BEARER CONTEXT ACTIVE, the UE shall locally deactivate the dedicated EPS bearer context (220) i.e. the UE shall set the state of the dedicated EPS bearer context to BEARER CONTEXT INACTIVE. Additionally, the UE shall delete any stored QoS flow description and all the associated QoS rules that are associated with the dedicated EPS bearer context (240) (i.e. that are associated with a dedicated EPS bearer)

The above basically means that upon inter-system change from WB-S1 mode to NB-N1 mode, for each PDN connection that is active (or that has a default EPS bearer context that is in state the UE should verify if there is a dedicated EPS bearer (context BEARER CONTEXT ACTIVE). If there is a dedicated EPS bearer (context), the UE should locally deactivate the dedicated EPS bearer context and shall also release or delete any associated QoS flow description and any QoS rule that is/are associated with this dedicated EPS bearer (context) or that are not associated with the default EPS bearer context (e.g. via a QFI as has been described earlier). The UE maintains the default EPS bearer context and creates the associated QoS flow description and associated default QoS rule.

As such, when the UE is in NB-N1 mode, the UE should ensure that every PDU session that is transferred from EPS will have only a default QoS rule but no non-default QoS rule.

The steps set out above mean that when a UE is performing an inter-system change from WB-S1 mode to N1 mode, the UE should perform the following check or determination:

If the UE determines that it is entering NB-N1 mode, then the UE behaves as proposed herein If the UE determines that it is entering WB-N1 mode, then the UE behaves as currently specified in TS 24.501 regarding the handling of QoS parameters and QoS flows and EPS bearers. Specifically, the UE can create QoS rules that are non-default QoS rules which can have associated QoS flow descriptions. The UE can also have a stored EPS bearer context for any associated dedicated EPS bearer.

Although a few preferred embodiments of the present invention have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a User Equipment (UE) in a wireless communication system, the method comprising:

changing a mode of the UE operating in a single registration mode from a WB-N1 mode to an NB-S1 mode in an idle mode;

upon changing the mode of the UE operating in the single registration mode from the WB-N1 mode to the NB-S1 mode in the idle mode, setting a state of a dedicated evolved packet system (EPS) bearer context to be inactive;

after setting the state of the dedicated EPS bearer context to be inactive, including an EPS bearer context status information element (IE) in a tracking area update (TAU) request message; and upon changing the mode of the UE operating in the single registration mode from the WB-N1 mode to the NB-S1 mode in the idle mode, locally deactivating a dedicated EPS bearer.

2. The method of claim 1, further comprising:

deleting any associated quality of service (QoS) rule and QoS flow descriptions associated with the dedicated EPS bearer.

3. The method of claim 1, further comprising:

determining that an EPS bearer is a dedicated EPS bearer in case that an EPS bearer identity is associated with a quality of service (QoS) flow description that is in turn associated with a QoS rule that is not the default QoS rule.

4. The method of claim 1, further comprising:

determining a number of protocol data unit (PDU) sessions that are active, and in case that the number of the PDU sessions is more than a total number of Data Radio Bearers (DRBs), that the UE supports in an NB-S1 mode, maintaining a maximum number of the PDU sessions that is equal to the maximum number of PDU session that is equal to the maximum number of DRBs that the UE supports in the NB-S1 mode.

5. A user equipment (UE) in a wireless communication system, comprising:

transceiver; and at least one processor configured to:

change a mode of the UE operating in a single registration mode from a WB-N1 mode to an NB-S1 mode in an idle mode, upon changing the mode of the UE operating in the single registration mode from the WB-N1 mode to the NB-S1 mode in the idle mode, set a state of a dedicated evolved packet system (EPS) bearer context to be inactive, after setting the state of the dedicated EPS bearer context to be inactive, include an EPS bearer context status information element (IE) in a tracking area update (TAU) request message, and upon changing the mode of the UE operating in the single registration mode from the WB-N1 mode to the NB-S1 mode in the idle mode, locally deactivating a dedicated EPS bearer.

6. The UE of claim 5, wherein the at least one processor is further configured to:

delete any associated quality of service (QoS) rule and QoS flow descriptions associated with the dedicated EPS bearer.

7. The UE of claim 5, wherein the at least one processor is further configured to:

determine that an EPS bearer is a dedicated EPS bearer in case that an EPS bearer identity is associated with a quality of service (QoS) flow description that is in turn associated with a QoS rule that is not the default QoS rule.

8. The UE of claim 5, wherein the at least one processor is further configured to:

determine a number of protocol data unit (PDU) sessions that are active, and in case that the number of the PDU sessions is more than a total number of Data Radio Bearers (DRBs) that the UE supports in an NB-S1 mode, maintain a maximum number of the PDU sessions that is equal to the maximum number of PDU session that is equal to the maximum number of DRBs that the UE supports in the NB-S1 mode.

9. The UE of claim 5, wherein the at least one processor is further configured to:

in case that the UE has deactivated any dedicated EPS bearer, send a Tracking Area Update (TAU) Request message including the EPS bearer context status information element (IE).

* * * * *